United States Patent
Miretti

(10) Patent No.: US 10,605,147 B2
(45) Date of Patent: Mar. 31, 2020

(54) ENGINE WITH EXPLOSION PROTECTION

(71) Applicant: Angelo Miretti, Milan (IT)

(72) Inventor: Angelo Miretti, Milan (IT)

(*) Notice: Subject to any disclaimer, the term of this patent is extended or adjusted under 35 U.S.C. 154(b) by 554 days.

(21) Appl. No.: 15/289,974

(22) Filed: Oct. 11, 2016

(65) Prior Publication Data

US 2017/0101917 A1    Apr. 13, 2017

Related U.S. Application Data

(60) Provisional application No. 62/240,068, filed on Oct. 12, 2015.

(51) Int. Cl.
*F01N 13/14* (2010.01)
*F01N 13/10* (2010.01)
(Continued)

(52) U.S. Cl.
CPC ........... *F01N 13/148* (2013.01); *F01N 3/021* (2013.01); *F01N 3/046* (2013.01); *F01N 3/2066* (2013.01); *F01N 13/102* (2013.01); *F01N 13/14* (2013.01); *F01P 3/20* (2013.01); *F01N 2240/30* (2013.01); *F01N 2310/00* (2013.01); *F01N 2310/02* (2013.01); *F01N 2310/10* (2013.01); *F01N 2510/00* (2013.01); *F01N 2510/02* (2013.01);
(Continued)

(58) Field of Classification Search
CPC ....... F01N 13/14; F01N 13/102; F01N 13/148
See application file for complete search history.

(56) References Cited

U.S. PATENT DOCUMENTS

| | | | | |
|---|---|---|---|---|
| 4,385,594 A | * | 5/1983 | Hauser, Jr. | F01P 3/20 123/41.29 |
| 6,510,833 B1 | * | 1/2003 | Anthon | B32B 5/26 123/198 E |

(Continued)

FOREIGN PATENT DOCUMENTS

| CN | 101538122 A | * | 9/2009 |
|---|---|---|---|
| CN | 205559068 U | * | 9/2016 |

(Continued)

OTHER PUBLICATIONS

DE-102012110707-A1 English Translation (Elwin Karim) May 2014.*
Stevens-Cloth-Style1700-SA-2—Lewco Products (Year: 2018).*
Insulation Specialties Contracting Corp. (Year: 2018).*

*Primary Examiner* — Mark A Laurenzi
*Assistant Examiner* — Jessica L Kebea
(74) *Attorney, Agent, or Firm* — Henry I. Schanzer

(57) ABSTRACT

The exhaust system of a diesel engine includes components such as a turbocharger and an exhaust manifold which can have very high internal temperatures (e.g., any surface having a temperature above 135° C.). In accordance with the invention the components subject to the high temperatures are coated with at least a first layer of thermally insulating material and a second layer overlying the first layer to provide surface protection. So coated, the temperature of the outer coated surfaces of these components is brought below an undesirably high level. Also, selected ones of the components may be water cooled and/or have a fitted jacket and/or be placed within an explosion proof enclosure. The input fuel line may also include a magnetic explosion proof fuel economizer to control the combustion process and reduce the internal temperature.

20 Claims, 9 Drawing Sheets

MIRETTI COATEX-A
- SPECIAL HIGH HEAT SILICONE
- SPECIAL SEALING COATING
- UNDERLYING COMPONENT

MIRETTI COATEX-B
- MIRETTI TX800
- MIRETTI GL800
- MIRETTI COAT800
- UNDERLYING COMPONENT

(51) Int. Cl.
  *F01N 3/021*  (2006.01)
  *F01N 3/04*   (2006.01)
  *F01N 3/20*   (2006.01)
  *F01P 3/20*   (2006.01)
  *F02B 39/00*  (2006.01)
  *F04C 29/04*  (2006.01)

(52) U.S. Cl.
  CPC ............ *F02B 39/005* (2013.01); *F04C 29/04* (2013.01); *Y02T 10/24* (2013.01)

(56) References Cited

U.S. PATENT DOCUMENTS

| | | | | |
|---|---|---|---|---|
| 2004/0177609 | A1* | 9/2004 | Moore, III | B01D 53/945 |
| | | | | 60/323 |
| 2011/0185575 | A1* | 8/2011 | Olivier | F01N 1/24 |
| | | | | 29/890.08 |
| 2013/0203936 | A1* | 8/2013 | Fujita | C09D 5/02 |
| | | | | 524/591 |
| 2015/0007795 | A1* | 1/2015 | Campostrini | F02M 27/04 |
| | | | | 123/445 |
| 2016/0084140 | A1* | 3/2016 | Dietz | D04H 1/4209 |
| | | | | 138/149 |
| 2018/0328254 | A1* | 11/2018 | Lehtonen | F01N 13/004 |

FOREIGN PATENT DOCUMENTS

| | | | | |
|---|---|---|---|---|
| CN | 108059724 A | * | 5/2018 | |
| DE | 102012110707 A1 | * | 5/2014 | ............ F02B 37/00 |

\* cited by examiner

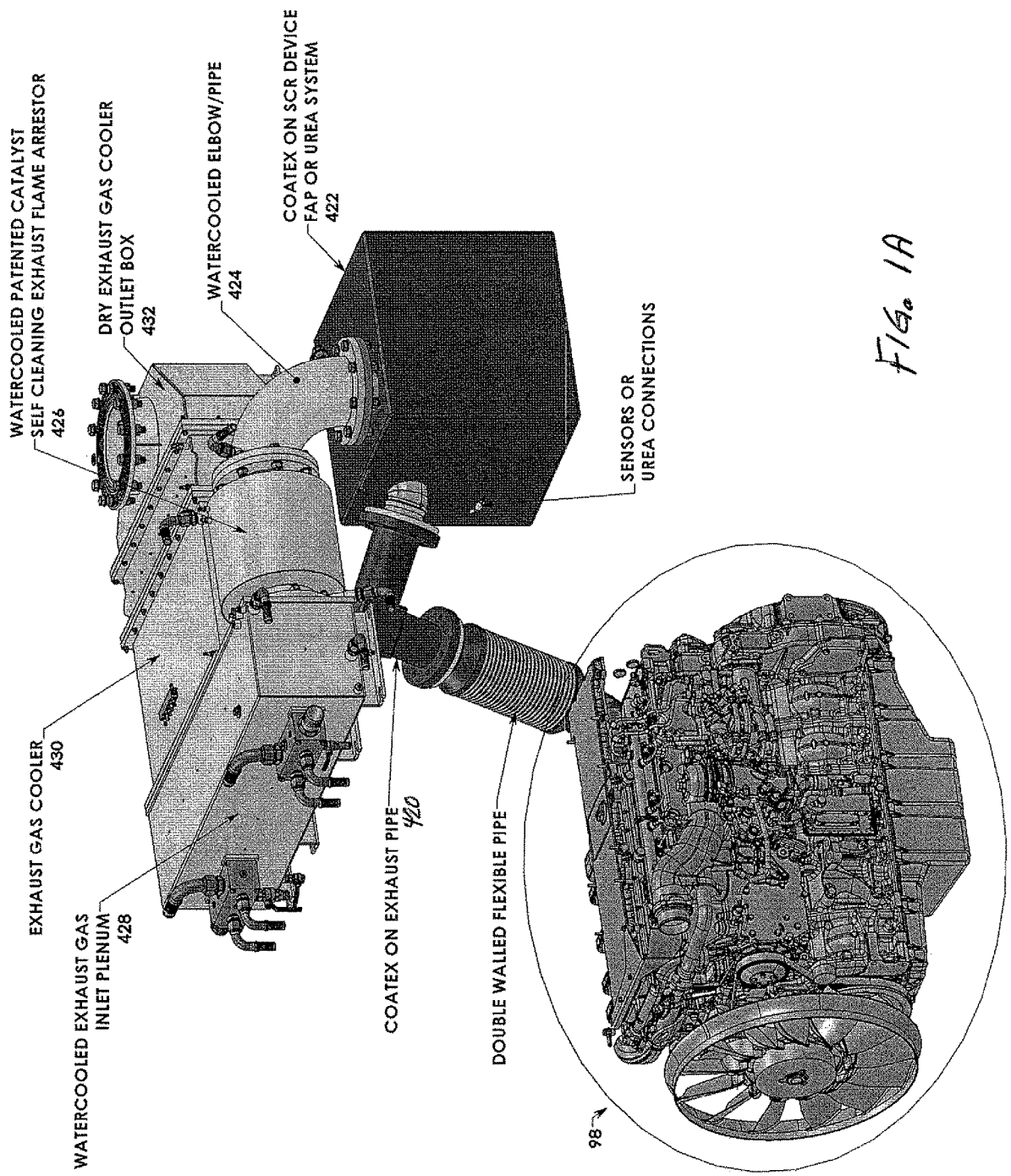

A- EXHAUST MANIFOLD UNCOATED FITTED ON A DIESEL ENGINE

**B- SECTION VIEW EXHAUST MANIFOLD COATED\* FITTED ON A DIESEL ENGINE-**

*coated with selected coating protocol from Coatex A-E or equivalent

**C- EXHAUST MANIFOLD COATED\* FITTED ON A DIESEL ENGINE**

D- EXHAUST MANIFOLD COATED WITH INSULATING CUSHION FITTED ON A DIESEL ENGINE

A) TURBOCHARGER UNCOATED
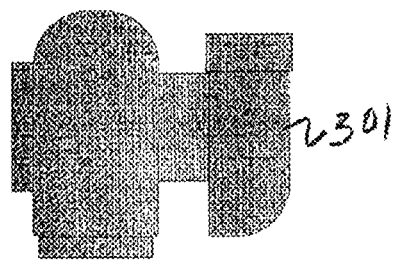
FIG. 3A
B) SECTION VIEW TURBOCHARGER COATED*
*coated with selected coating protocol from Coatex A-E or equivalent
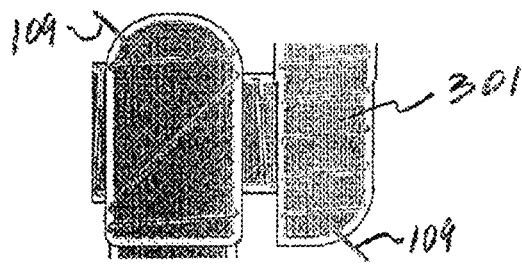
FIG. 3B
C) TURBOCHARGER COATED*
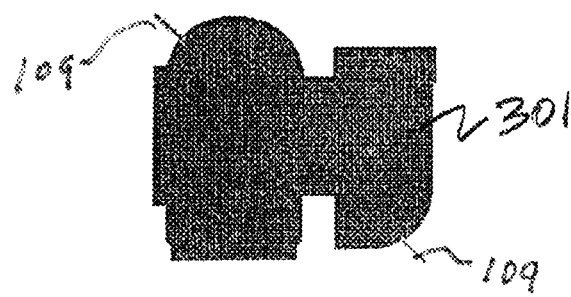
FIG. 3C
D) TURBOCHARGER COATED WITH INSULATING CUSHION
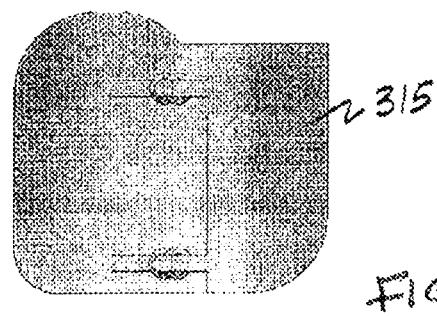
FIG. 3D
FIG. 3

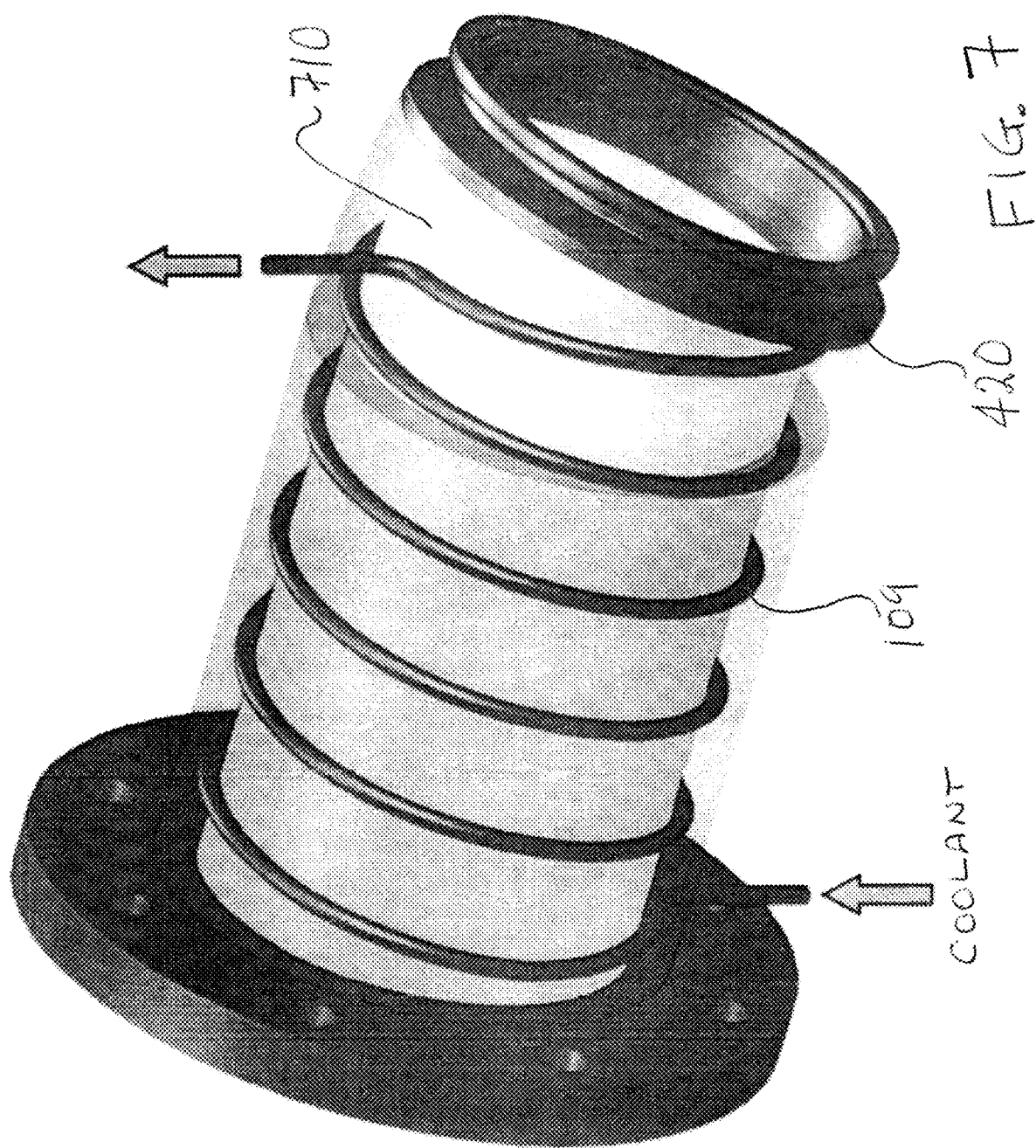

MIRETTI COATEX-A

SPECIAL HIGH HEAT SILICONE
SPECIAL SEALING COATING
UNDERLYING COMPONENT

MIRETTI COATEX-B

MIRETTI TX800
MIRETTI GL800
MIRETTI COAT800
UNDERLYING COMPONENT

MIRETTI COATEX-C

MIRETTI HT800
MIRETTI TX800
MIRETTI GL800
MIRETTI COAT800
UNDERLYING COMPONENT

MIRETTI COATEX-D

MIRETTI FB800
MIRETTI TX800
MIRETTI GL800
MIRETTI COAT800
UNDERLYING COMPONENT

ENGINE WITH EXPLOSION PROTECTION

This application claims priority from provisional application Ser. No. 62/240,068 filed 12 Oct. 2015 for Engine with Explosion Protection.

BACKGROUND OF THE INVENTION

This invention relates to apparatus and methods for making explosion proof exhaust systems and, in particular, to explosion proof systems in which the outer surfaces of certain engine and exhaust components exceed a preset temperature (e.g., 135° C.). Many pieces of equipment (e.g. internal combustion operated industrial machinery) have to be operated in areas where gases and flammable substances are present. The heat generated by the engines and the exhaust fumes of these pieces of equipment may cause the gases and/or flammable substances present in the area to ignite and/or explode. It is therefore necessary to reduce the external surface temperature of the pieces of equipment. It is also necessary to prevent sparks/flames from being emitted out of the exhaust. It is further necessary and/or desirable to reduce the pollutants emitted by the pieces of equipment.

Known methods of blanketing selected components to limit temperature problems are not satisfactory. The blankets are not gas tight and explosion proof. That means that a gas can always find a point of contact and also if there is an internal explosion the eventual enclosure is not explosion proof. Presently used efficient exhaust treatment soot filters, selective catalytic reduction (SCR) devices and active soot burners are very dangerous when used in potentially explosive environment s they typically have very hot surfaces and high risk of internal explosions if the explosive gas is sucked by the engine and transferred to the active catalyst, SCR and soot filters. At this time there does not exist such devices rated as secure to be used in a potentially explosive environment.

The need for explosion proof systems may be met with explosion proof systems and methods embodying the invention.

SUMMARY OF THE INVENTION

In accordance with the invention, selected components of an engine are coated and treated to reduce the temperature of the outer coated surfaces in order to prevent any gases or fumes from making contact with a "hot" surface (e.g., any surface having a temperature above 135° C.). In particular, in accordance with the invention, a multi-layer coating is applied to selected engine components (e.g., exhaust manifold, turbocharger, interconnecting piping) for preventing exhaust gas from escaping from the component and simultaneously thermally insulating the components to prevent any of the gases present in close proximity to the engine component from coming into contact with any "hot" surface (e.g., any surface having a temperature above 135° C.). One coat of the multi-layer coating is especially designed to provide sealing and thermal insulation and another overlying coat is especially designed to provide surface protection to the underlying insulating layer as well as additional thermal insulation to its corresponding component. Furthermore cooling arrangements, including tubing carrying coolants, may be wound (or placed) over selected coated components and/or wound within the coating of selected components to ensure that their outer surface temperature does not exceed a desired level. Still further, selected ones of these components, whose external (or "outer") surface temperature, although coated, may still exceed a desired temperature may be covered with insulating "jackets" and/or encased with explosion proof enclosures.

In accordance with the invention an explosion proof system may include a specially modified fuel economizer device (e.g., a Miretti modified economizer also referred to as a "Mecon" device).

Thus, explosion proof systems embodying the invention may include the combination of (a) applying a special multi-layer coating to the components, (b) water cooling the components, (c) "jacketing" them, (d) enclosing them in explosion proof enclosures, and (e) using a fuel economizer.

BRIEF DESCRIPTION OF THE DRAWINGS

In the accompanying drawings which are drawn to scale like reference characters denote like components; and FIGS. 1A and 1B shows two different views of a diesel engine and its gas exhaust system which is to be coated in accordance with the invention;

FIG. 3 composed of FIGS. 3A-3D, illustrates the turbocharger of a diesel engine coated in accordance with the invention;

FIG. 7 is an isometric drawing showing a metallic serpentine tubing deployed in accordance with the invention along a component forming part of the exhaust system of a diesel engine; and FIG. 8, comprising

DETAILED DESCRIPTION OF THE INVENTION

Figure 1B:
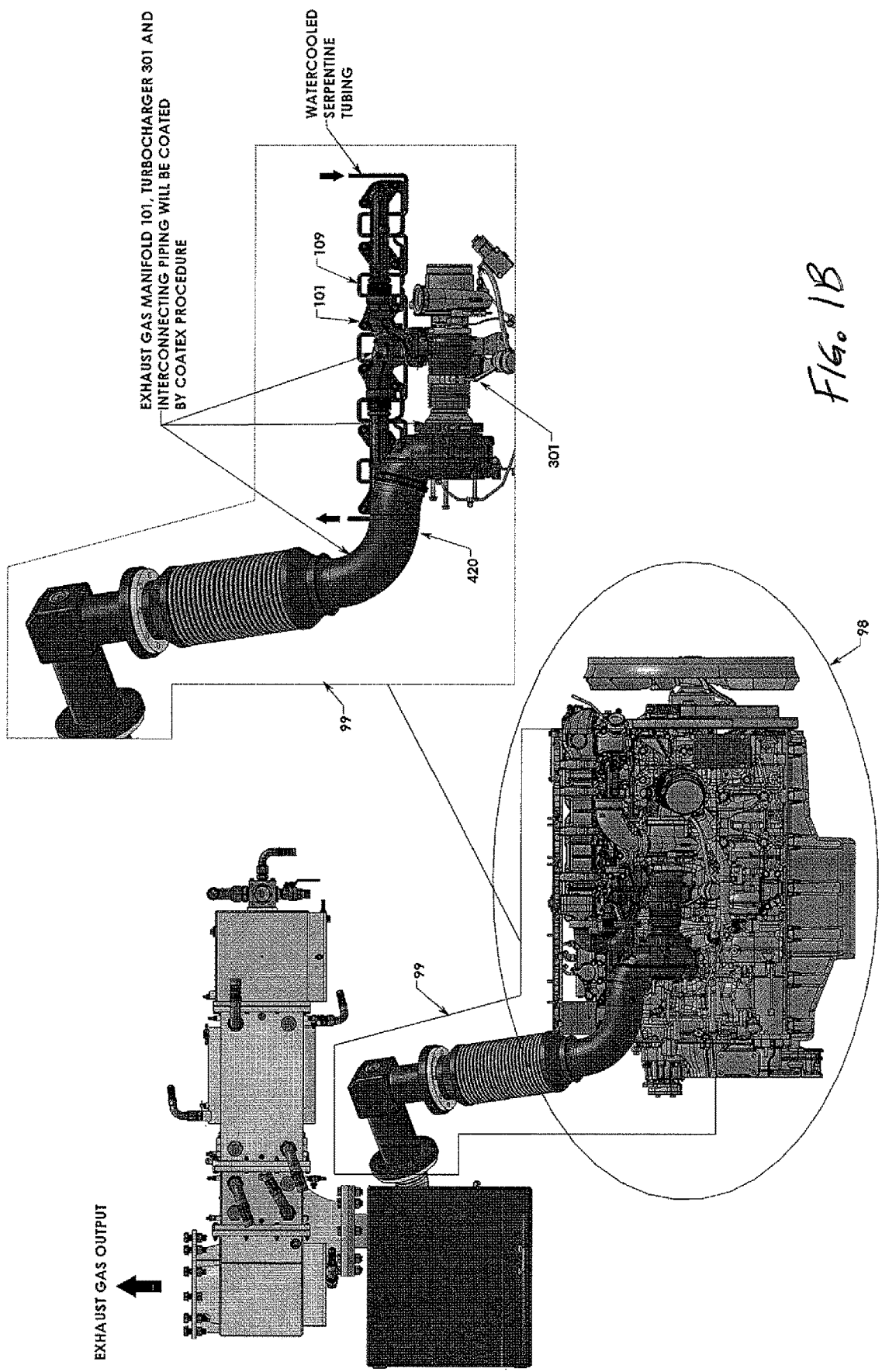

Referring to FIGS. 1A and 1B there is shown an engine 98 whose exhaust gases pass through an exhaust manifold 101, an associated turbocharger 301 and interconnecting piping apparatus. The portion of the engine components which includes the exhaust manifold 101, the turbocharger 301 interconnecting piping apparatus and tubing 109 for carrying a coolant are shown in box 99. In accordance with one aspect of the invention, the components in box 99 as well as other selected components (shown in FIGS. 1A and 1B) are coated with a special multi-layer coating ("Coatex") as described below. When coated, the temperature at the outer surface of these components, which are exposed to the ambient, will be much lower than their internal temperatures. Typically, the outer surface temperature of these components will be kept under 135 degrees centigrade.

FIG. 1B also shows a water cooled serpentine tubing apparatus 109 wound around the turbocharger 301 in order to extract heat from its associated component. Water-cooled metallic tubing may also be wound around the exhaust manifold and around other selected components to extract heat and cool their outer surfaces. The water cooled tubing is normally wound around, or applied to, selected components after they have been coated with at least one thermally insulating coat. Where a coated component includes additional insulation, the tubing may also be inserted inside the insulation layer associated with that component.

FIG. 7 shows a metallic tubing coil 109 wound around a component in what may be termed a serpentine shape. In FIG. 7 the metallic serpentine tubing is wound around a portion of exhaust piping 420. As noted above, the metallic tubing 109 is wound around the component after the component has been coated with at least one sealing and thermally insulating layer so the tubing is not in direct contact with the underlying component. A coolant may be passed through the serpentine tubing to extract heat. In FIG. 7, the component is covered with an insulating layer 710 in addition to the insulating coat of Coatex and the tubing may be wound over the layer 710 or within the layer 710. The metallic serpentine tubing 109 as well as its associated component may also be coated with a multi-layered coating and wrapped with a thermal cushion as discussed below in the figures a serpentine winding is shown. However, it should be understood that depending on the configuration of the underlying component, cooling elements of different shapes may be applied to and/or wound around an underlying component.

In systems embodying the invention, in addition to coating all critical components whose external temperature may exceed a desired temperature (e.g., 135° C.), an explosion proof enclosure may be formed around each (or selected ones) of the exhaust components. Also, all or selected components within the enclosure may be wrapped with an insulation jacket.

In accordance with the invention, all, or selected, components of an engine's exhaust system are coated with at least two layers of special materials. Typically, the first layer is especially intended to cover the entire surface of the underlying component to prevent hot gases from escaping and to simultaneously provide thermal insulation. Therefore, the first layer may be referred to herein and in the accompanying claims as a sealing and thermally insulating layer. The second overlying layer is intended to provide surface protection for the first layer and its underlying components and may, in addition, provide additional thermal insulation. Therefore, the second layer may be referred to herein and in the accompanying claims as a protective and thermally insulating layer.

Figure 8A:
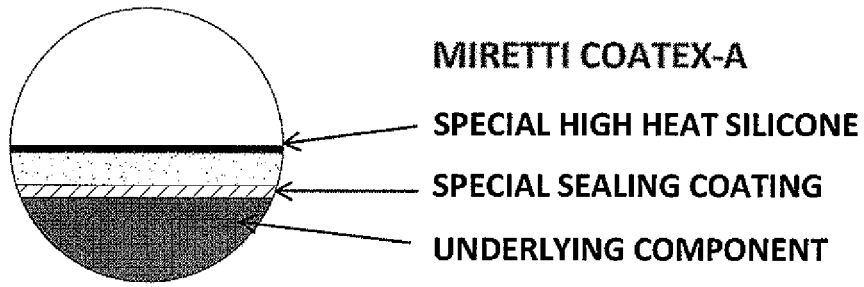
FIGS. 8A through 8E, is an illustrative partial cross-sectional diagram showing the application of various different coating layers to an underlying engine component (e.g., exhaust manifold, turbocharger, interconnecting piping).

Referring to FIG. 8A there is shown that an underlying component (e.g., exhaust manifold, turbocharger, associated piping) is coated with a first special sealing coating (layer) and a second special high heat silicone coating (layer) overlying the first coating. This combination of layers is referred to herein as Coatex-A.

However, in many embodiments of the invention, as shown in FIGS. 8B through 8E, more than two layers may be applied to underlying components. But, the basic concept is to have layers for sealing of the underlying corn portent to prevent gases from escaping and simultaneously providing thermal insulation and layers for providing a protective coating to avoid abrasion of the sealing/insulating layer.

Figure 8B:
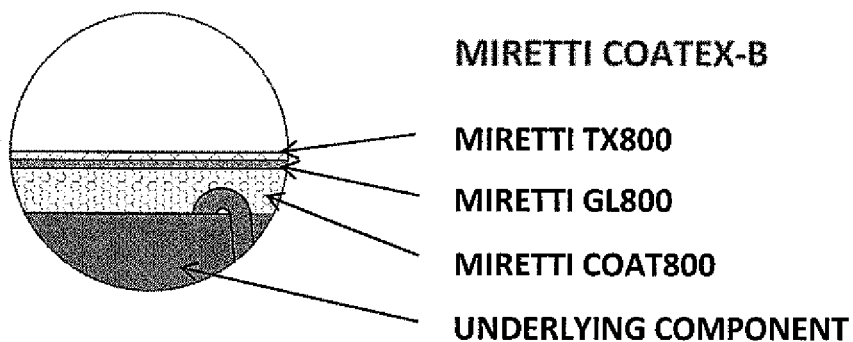

Thus, in FIG. 8B there is shown that an underlying component is coated with a first special sealing coating (Miretti Coat800), a second adhesive coat (GL800), and a third coat (Miretti TX800) which is of a thermos-glass fabric. The first Coat800 provides sealing and a degree of thermal insulation to the underlying component under relatively high temperature condition (up to 800° C.). The second coat (GL800) is a high temperature adhesive which functions to cause adhesion of the third layer (TX800) designed top provide a protective layer and additional thermal insulation to the underlying component. This combination of layers is referred to as Coatex-B. This combination allows for better sealing and thermal insulation than Coatex-A when operating at higher temperatures of the underlying components.

Figure 8C:
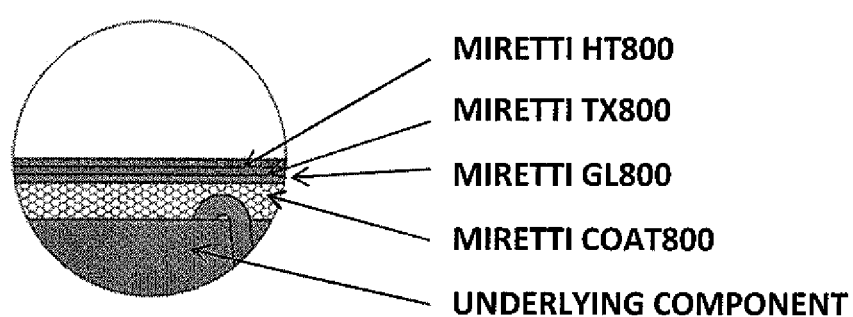

In FIG. 8C there is shown that an underlying component is coated with a first special sealing coating (Miretti Coat800), a second adhesive coat (GL800) and a third coat (Miretti TX800) as for Coatex-B. However, there is also applied a fourth coat (Miretti HT800) to provide additional protection and thermal insulation. This combination of layers is referred to as Coatex-C. Coatex-C allows for better thermal insulation than Coatex-A or Coatex-B when operating at still higher temperatures than contemplated for Coatex-A or Coatex-B.

Figure 8D:
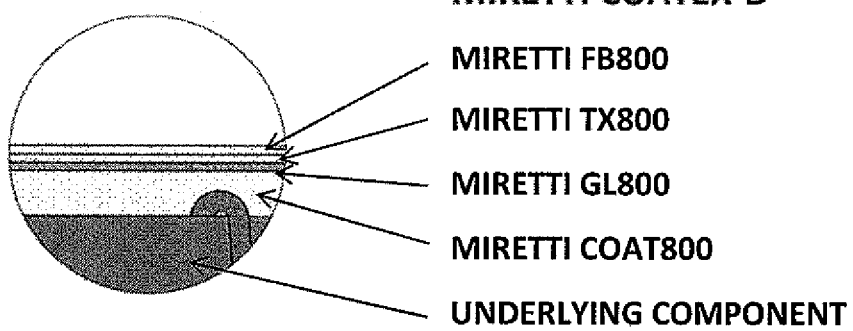

In FIG. 8D there is shown that an underlying component is coated with a first special sealing coating (Miretti Coat800), a second adhesive coat (GL800) and a third coat (Miretti TX800) as for Coatex B and C. There is also applied a fourth coat (Miretti FB800) which is a special carbon fiber layer for providing protection and additional thermal insulation. This combination of layers is referred to as Coatex-D. Comparing Coatex-D to Coatex-C note that the hard coat HT800 is replaced with an alternative protective layer (FB800). Coatex-C and Coatex-D present alternative possibilities.

Figure 8E:
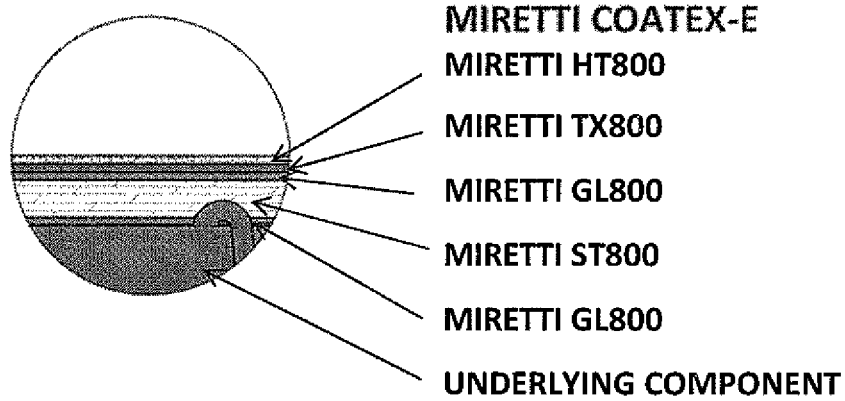

In FIG. 8E there is shown that the first layer applied to an underlying component an adhesive layer GL800. A second layer ST800 is formed over the first layer. A third adhesive layer is applied to the second layer. Then a fourth layer of TX800 is attached to the third layer and a fifth layer of HT800 is applied over the fourth layer. The first adhesive layer provides good adhesion between the underlying component and the second layer (Miretti ST800) which is special rock wool coating which can operate up to 1000° C. and thus provide good thermal insulation. The fourth coat (Miretti TX800), and the fifth coat (Miretti HT800) provide additional thermal insulation and protection to the underlying layers and components. This combination of layers is referred to herein as Coatex-E.

The choice of coatings selected for use and the number of layers depends on the component, its operating temperature, the placement of the component, customer request and economic considerations.

In the discussion herein, reference is made to a multi-layered coating process, illustrated by the application of various. Coatex coatings. The multi-layered process, includes the application of at least two different layers ("coats") of material to the outer surface of selected components. Typically, in the case of Coatex-A, a first layer is applied to the engine component of interest. This first layer is formed of a special sealing coating and is primarily intended to prevent gases from escaping from the component and to provide thermal insulation. The second layer, formed of a special silicone coating, is primarily intended to provide physical (abrasion and scratching) protection to the underlying coated surface. This ensures that the thermal coating does not get scratched or abraded.

In accordance with the invention, all, or selected, engine components may be coated with a multi-layer coating (Coatex). Most importantly, the engine components that develop, or tend to develop, high surface temperature such as the exhaust manifold, turbocharger and any exhaust pipes, will be coated with the Coatex methodology and process. By way of example, a method for applying the various different coats to an exhaust manifold is illustrated in FIGS. 2A-2D, and a method for applying the various different coats to a turbocharger is shown in FIGS. 3A-3D. The procedure is aimed at maintaining the temperature of the outer surface of the components of the diesel engine, exposed to the ambient, under 135° C.

Figure 2A:
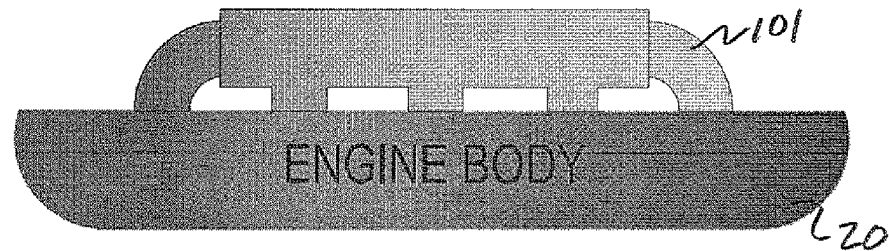
FIG. 2, composed of FIGS. 2A-2D, illustrates the exhaust manifold of a diesel engine coated in accordance with the invention.
Figure 2B:
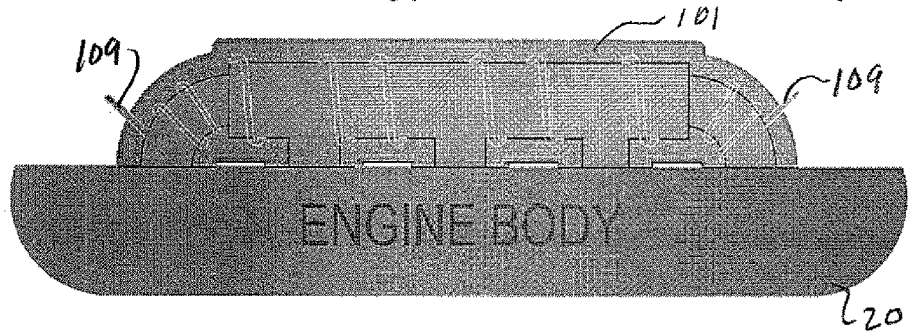
Figure 2C:
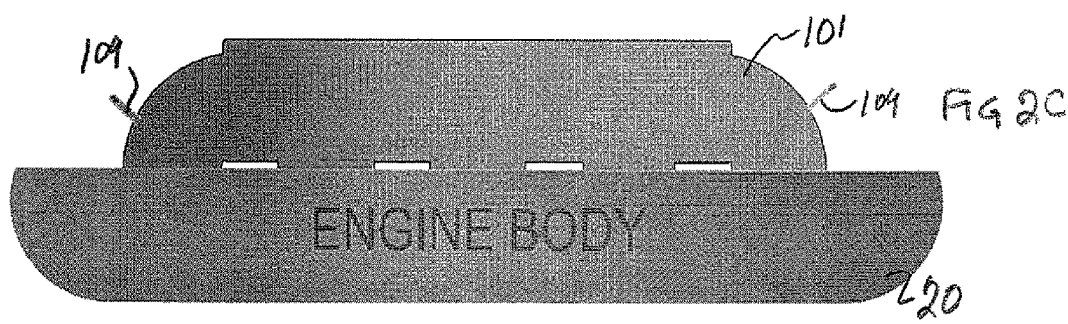

Referring to FIG. 2A there is shown a highly simplified symbolic representation of an engine body 20 and an exhaust manifold 101. The uncoated exhaust manifold 101 is first fitted on the engine body 20. Then, as shown in FIG. 2B, the exhaust manifold 101 is coated with a selected coatex (e.g. any on, one of coatex A through E) and/or any equivalent coating arrangement. After the exhaust manifold 101 is coated, it is remounted on the engine as shown in FIG. 2C.

Figure 2D:
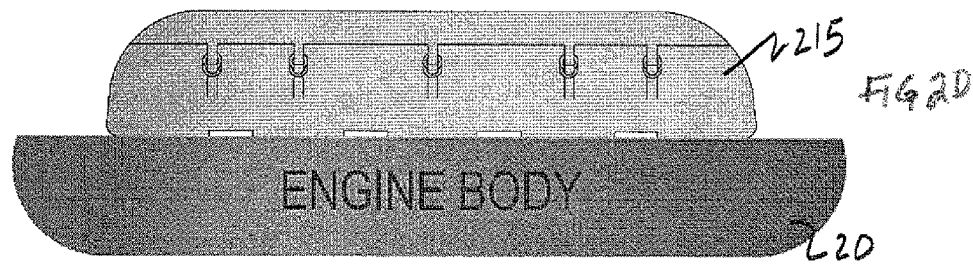

FIG. 2B also shows that, in addition to coating the manifold, a metallic cooling tube 109 for carrying a coolant is wound around the exhaust manifold 101. The tubing 109 may be wound around the manifold 101 after, at least, the first coating layer is applied to the manifold and cured so the tubing is not in direct contact with the uncoated manifold surface. After the application of any of the Coatex coatings (A through E) or any equivalent, an insulating cushion (jacket) 215 may optionally be fitted about the exhaust manifold 101 as shown in FIG. 2D.

Referring now to FIG. 3A, there is shown an uncoated turbocharger 301. As shown in FIG. 3B, the turbocharger 301 is coated with a selected coatex coating (e.g., any one of coatex A through E) and/or any equivalent coating arrangement. FIG. 3B also shows that, in addition to the coating, cooling tubing 109 is wound around the turbocharger 301. As in the case of the manifold, the tubing would be placed on the turbocharger after the application and curing of at least a first thermally insulating coat. The turbocharger is then ready to be mounted on the engine as shown in FIG. 3C. Then, an insulating cushion ("jacket") 315 may optionally be fitted about the turbocharger 301 as shown in FIG. 3D.

The different coating leers are designed to provide desired characteristics. In the case of Coatex-A, the first coat applied to a selected components is a thermally insulating sealing coat intended to reduce the temperature seen at, and along, the outer (external) surfaces of the coated component. This calls for the application of a special thermally insulating sealing coat over the entire exposed surface of selected (if not all) components. The special sealing coating is applied to have a specific thickness (e.g. it may range from less than 3 millimeters to more than 10 millimeters) to provide good sealing and a desired degree of thermal insulation. The special sealing coating is cured (dried) after being applied. A suitable thermally insulating sealing coating is preferably a flexible light, ecologically and environment friendly, non-toxic, water-based, material. It is preferably easy to apply to any surface. It is intended for use in any environment where there is risk of explosions, such as, for example, coal mines, chemical and pharmaceutical plants, refineries and so on and in marine applications such as oil platforms.

An example of such a suitable sealing material a se in coating referred to as MIRETTI Coat600 which is made of:
(a) 40-60% acrylic resin ($C_3H_4O_2$) and silicone resin (RniSiXmOy);
(b) 50% carbonate powder ($CaCO_3$), vermiculite ($Mg^{+2}$, $Fe^{+2}$, $Fe^{+3}$)$_3$ and talc ($Mg_3Si_4O_{10}(OH)_2$); and
(c) 10-20% water ($H_2O$).

It should be understood that the formulation of the Miretti Coat 600 is given by way of example only and that other formulations having similar characteristics may be used instead.

Other characteristics of the Miretti Coat 600 which make it suitable for use as a sealing coat are set forth in the table below.

| Additional MIRETTI COAT 600 TECHNICAL DATA | |
|---|---|
| Max temperature | 700° C. |
| Thermal Conductivity | 0.020 W/Mk |
| VOC content | Zero |
| Weight | 0.60 kg/m$^2$ when wet |
| | 0.20 kg/m$^2$ when dry |
| Fire spread - Flame spread | None - Class A1 |
| Coat thickness | Variable (3-10 mm0 |
| Coverage: liters per square meters | 2.8 lt/m$^2$ × 3 mm of thickness |

After the application and curing of the first thermally insulating sealing layer a second top coat layer comprised of a special high heat resistant silicone material is applied over the first coat to provide scratching and abrasion protection for the first coat and the surfaces of the underlying component. The second top coat is preferably a high heat resistant hard coat which is also easy to apply. An example of a high heat resistant silicone is a special high heat silicone MIRETTI HT600 which has a very high resistance to heat. The scratch resistant silicone coating is intended for use in combination with the special thermally insulating sealing coating in explosion prone environments, as noted above. A particular silicone coating MIRETTI HT600 was made of:

| (a) | 300 g | Heat-resistant silicone Si(OCOCH$_3$)$_4$; |
| (b) | 100 g | Nitro thinner CH$_3$OH; |
| (c) | 150 g | Hardener CH$_3$N—CO; |
| (d) | 20 g | Topcoat CH$_3$(CH$_2$)$_3$OH; and |

(e) Other characteristics of the Miretti HT600 hard coat which makes it suitable for use as a protective coat include its operability at elevated temperatures and very good ultraviolet and chemical resistance, elasticity and filling power.

It should be understood that the formulation of the Miretti HT600 is given by way of example only and that other formulations having similar characteristics may be used instead.

The two layers when applied to, and over, the surfaces of selected components make it possible to reduce the temperature on the outer surface of the components treated by significant amounts (e.g., by 75% when the ambient temperature is 60 degrees centigrade). The two layered Coatex-A functions to reduce the external temperature of the components when the engine is working, below a predetermined level (e.g., 135° C.).

As discussed above, and as shown in FIG. 8, Applicant developed several different multi-layered coating protocols. The different protocols are tabulated in Table 1 below. A difference between Coatex A and the other coatings is that the others function better or are preferable at higher operating temperature.

TABLE 1

| Coatex-A | Coatex-B | Coatex-C | Coatex-D | Coatex-E |
|---|---|---|---|---|
| Coat600 Special sealing coating | Coat800 | Coat800 | Coat800 | GL800 |
| HT600 Special high heat silicone | GL800 | GL800 | GL800 | ST800 |
|  | TX800 | TX800 HT800 | TX800 FB800 | GL800 TX800 HT800 |

Where:
Coat800 is a special sealing and thermal insulating coating including alumino-silicates, siliceous binding agent and textile glass fibers and is useful to 800° C.;
GL800 is a special adhesive including cristobalite and crystalline silica and is also designed to function up to 800° C.;
TX800 is a special thermal insulator, protective and sealing coating of thermoglass fabric composed primarily of E-glass (e.g., 91.5%) and stainless steel (e.g., 8.5%) designed to function as a protection layer up to 800° C.;
HT800 is a special protective coating and sealer made of silicic acid, sodium salt and quartz and is designed to function as a protective and thermally insulating layer to 1250° C.;
FB800 is a special protective coating and sealer made of carbon fiber made of polyacrylonitrile, rayon, polyoxypropylene, diamine and bisphenol and is designed to function as additional protection wrapping to protect the integrity of the underlying coating(s) and components; and
ST800 is a special thermal insulator made of rock wool which includes diabase, basalt and dolomite and which functions to provide thermal insulation to 1000° C.;

Each of the various multi-layered coatings (Coatex A through E) provides a dust and gas impermeable explosion proof insulation multi-layer system. When applied to the components of a diesel engine it reduces the surface temperature of the underlying component making it safer to operate the engine in an environment which is potentially explosive. It also has anti-condensation capabilities. The special sealing layer and the special high heat silicone layer can be applied in the same manner as layers of paint. By spray, brush, roller, spatula, etc . . . .

FIGS. 2 and 3 illustrated the coating of two components. It should be understood, that all components and piping may be coated with a suitably selected Coatex similar to: (1) Coatex-A, or (2) Coatex-B, or (3) Coatex-C, or (4) Coatex-D, or (5) Coatex-E. It should also be understood that any equivalent coating arrangement may also be used.

The insulated cushions (jackets) shown in FIGS. 2D and 2D may be made of an insulating glass fabric which can be tailored for application to specific components. The jackets are generally made of a high temperature and fire resistant aluminized and insulating fiberglass material. They may be padded, for example, with insulating, glass wool or rock wool and be provided with means (e.g., hooks) for securing the jacket to or about their underlying components. The insulated jackets are used to retain the heat in the technical installations and, for example, to coat those accessories and machinery which after being installed require regular maintenance. The insulating jackets also function to protect the integrity of the underlying coating (layers) from damage due to mechanical or chemical causes. That is, if an object were to fall on the component, the insulated jacket (blanket) would prevent the underlying coating layer from being damaged. Similarly, the insulating jacket would prevent a leaking corrosive chemical substance form contacting the underlying coating layer and damaging it.

The insulating cushion ("jackets") also function to protect persons and objects from being injured or damaged when making contact with the exhaust hot turbocharger or manifold. The jackets are not explosion proof as, in general, they are not gas tight. However, these jackets may be used on exhaust systems to provide normal heat shielding and to prevent fuel spraying coming into easy contact with the exhaust. In accordance with the invention, selected components are provided with: (a) a multi-layered protective coating (e.g., two (2) or more layers of coating): and/or (b) tubing to allow a coolant to flow about the component; and/or (c) insulating jackets; and/or (d) explosion proof chambers. A textile article insulation, is used to retain the heat around the component. The jackets also function to coat those accessories and machinery which after being installed require regular maintenance. In order not to move the stuffing insulation, insulating mats, as mattresses, may be quilted.

Figure 4:
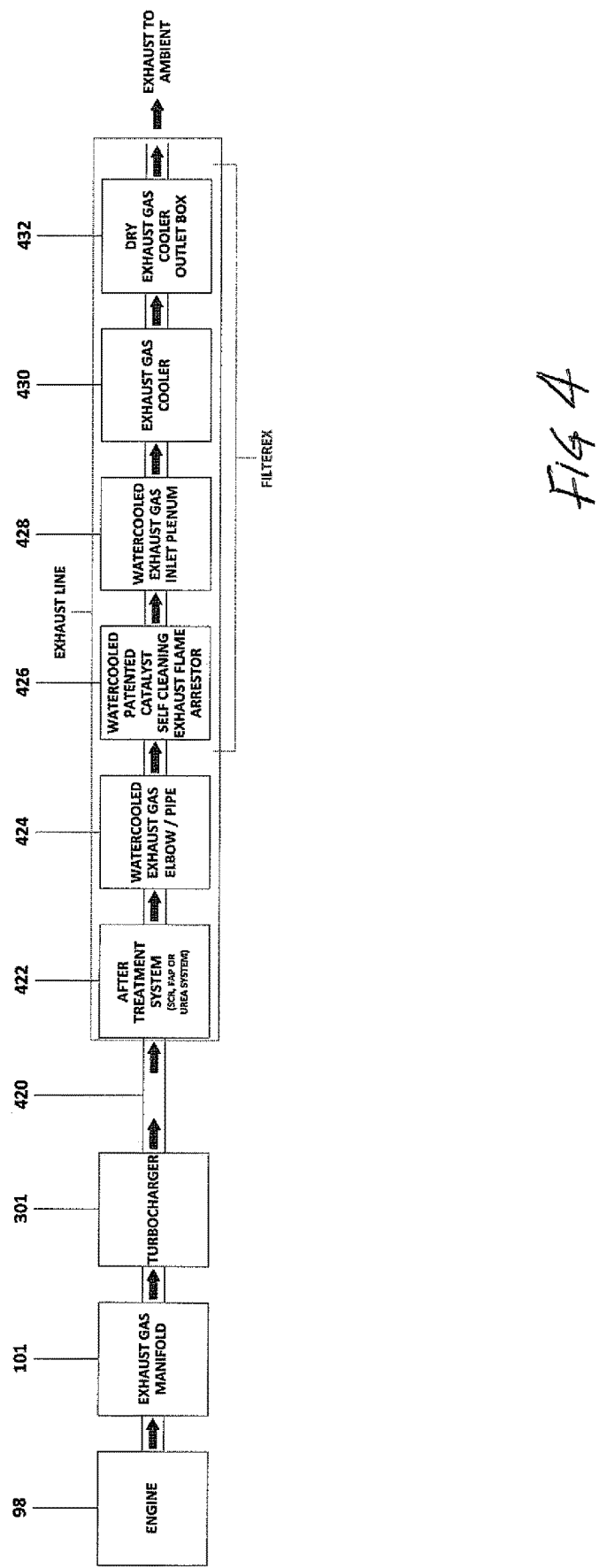
FIG. 4 is a simplified flow diagram illustrating the flow of exhaust gases through the exhaust system of a diesel engine.

FIG. 4 is a highly simplified block diagram illustrating the flow of the exhaust gases through the engine exhaust system shown in FIGS. 1A and 1B.

Referring to FIGS. 1A, 1B and 4, it is shown (for ease of description) that the exhaust gases from the engine 98 flow through exhaust manifold 101 and then through, the turbocharger 301 and then via an exhaust pipe 420 through after treatment system 422 and water cooled exhaust gas elbow pipe 424 into a water cooled chamber 426. The gases then flow through a water cooled exhaust gas plenum 428 and then through exhaust gas cooler 430 and dry exhaust gas cooler outlet box 432 into the ambient.

Note that chamber 422 contains selective catalytic reduction (SCR) devices. Chamber 422 can also include a diesel particulate filter (DRF) which includes a mechanism for automatically regenerating the filter by post-injection of diesel fuel to increase the temperature of the exhaust gases and burn the agglomerates of the exhaust and/or or a Urea system (the gaseous urea, is added to a stream of exhaust gas and is adsorbed onto a catalyst in order to reduce mono nitrogen oxide gases, NOx). The selective catalyst reduction (SCR) devices with urea injection and the particulate filter (passive or with active fuel burning system) and their related components are protected by being enclosed within water jacket cooled explosion proof enclosure (e.g., chamber 422) of special construction. The exhaust gas temperature is reduced after the SCR and/or soot filters devices by means of a specially designed compact cooling heat exchanging enclosures (424, 426) as shown in FIGS. 1A, 1B and 4.

Chamber 426 is water cooled and may also be jacketed and encased in an enclosure and is designed to have flame arresting capability as disclosed in U.S. Pat. No. 8,256,212 issued to the present applicant and whose teachings are incorporated herein. The gases then flow via a water cooled exhaust gas inlet plenum 428 to exhaust gas cooler 430 and then via dry exhaust gas outlet box to the ambient.

All the exhaust components through which the exhaust gases flow may be selectively: (a) coated by multi-layered coatings of the type discussed above; and/or (b) water cooled via tubing or any suitable cool rig apparatus; and/or (c) jacketed or blanketed; and/or enclosed within an explosion proof enclosure.

Figure 5:
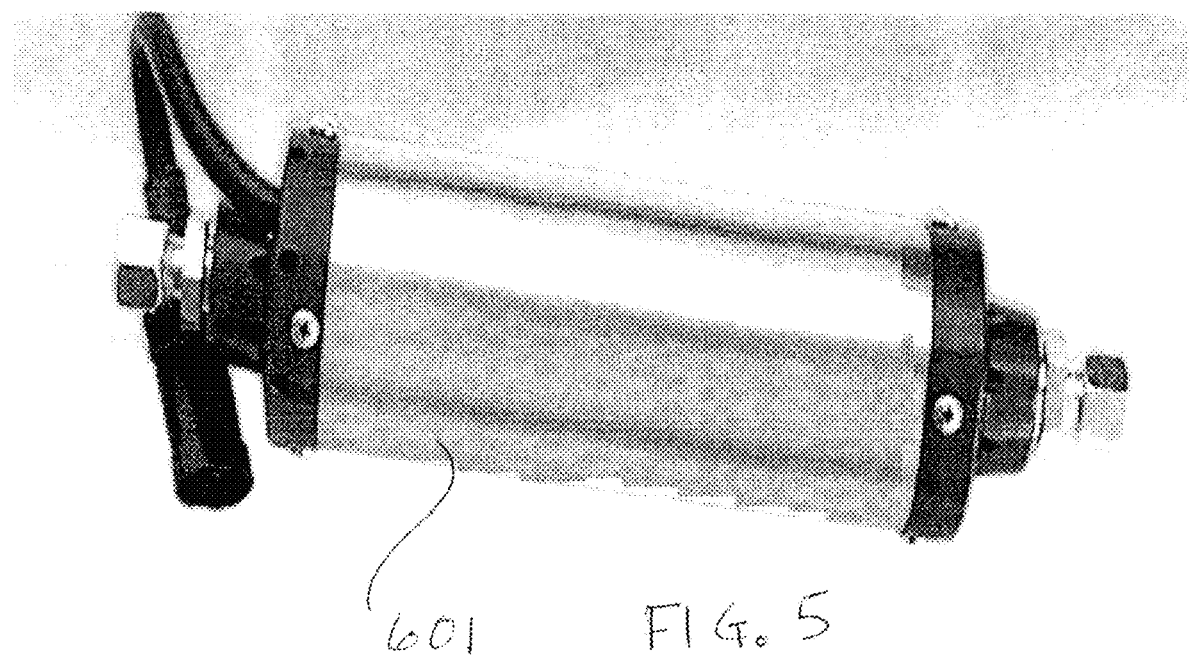
FIG. 5 is a photograph of fuel economizer for use in systems embodying the invention.
Figure 6:
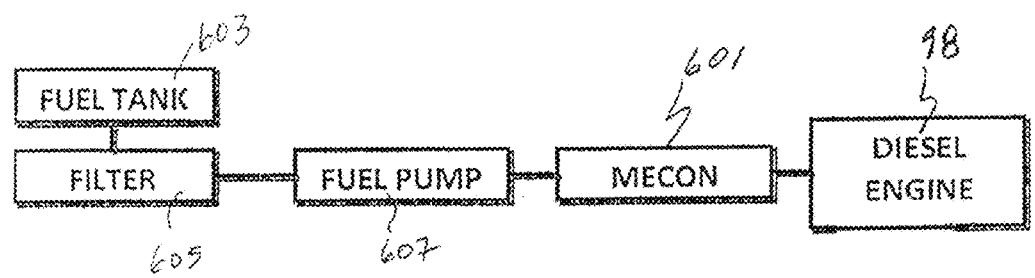
FIG. 6 is a block diagram illustrating the insertion of a fuel economizer (Mecon) device along the fuel injection path in systems embodying the invention.

Miretti Economizer (MECON) Device (See FIGS. 5 and 6)

A magnetic explosion proof special fuel economizer device 601 (see FIGS. 5 and 6) is fitted on and along the engine fuel lines. The device 601 is mounted upstream of the combustion process to reduce the $CO_2$ emissions and to reduce fuel consumption with atomization of the diesel fuel particles thus minimizing the maintenance of the applied flame arrestors and exhaust after treatments devices. FIG. 6 is a highly simplified block diagram showing the placement/location of a fuel economizer device (e.g., a Mecon device) in the fuel line, before the fuel goes into the combustion chamber. The input fuel goes from the fuel tank 603 via filter 605 to fuel, pump 667 and via the mecon device 601 to the engine 609.

There are commercially available fuel economizers and such devices are described in the literature (see WO 2013/098705 titled Anti-Pollution economizer Device). The fuel economizer used by applicant, mecon 601 may be a commercially available device modified using materials operable at higher temperatures and whose subcomponents are coated. Modifying the outer surface of the mecon device 601 with multi-layered coatings of the type discussed above (e.g., Coatex A through E) and selectively coating its subcomponents enables the mecon device 601 to be used more effectively in hazardous areas. Although, the Mecon device 601 is located on the input line sides it is part of an explosion protected engine because it optimizes the combustion of the fuel; improving its quality and reducing the share of unburned carbonaceous in the exhaust gases. Thus the use of Mecon 601 aids in the after treatment system since it enhances the performance of the catalyst after treatment devices further reducing exhaust gas emission concentration.

It has thus been shown that in accordance with the invention, an engine with explosion protection includes coating, selected components (primarily those associated with processing the exhaust gases) with at least a sealing and thermal insulator layer and a surface protecting layer. It has also been shown that selected components can be "jacketed" and/or encased in explosion proof casings and/or water cooled.

The advantages of using an explosion protective system discussed above include:

Very low production of pollutant agents;
Reduction of Carbon Dioxide ($CO_2$) emission;
High saving of fuel consumption, up to 7%;
Drastic reduction of maintenance on flame proof equipment;
No service stop for flame arrestor cleaning in normal operation condition.
The surface temperature management by coating critical components and the use of special double wall water jacketed explosion proof metallic enclosures result in a gas tight system such that the explosive gas or substance cannot penetrate the insulation and touch the hot surface. The metallic double jacketed enclosures are also explosion proof in case there is an accidental inside formation of explosive environment due to malfunction of the after treatment catalyst or soot filter system or soot burning active system. That means that the eventual explosion is kept inside the armored enclosure.
Using the inventive processes (multi-layer coating, jacketing, water cooling and/or encasing) and associated technology enables reducing the surface temperature and provides a gas tight and explosion proof system. The system as designed does not alter the internal back pressures and temperatures in order to function as an efficient exhaust cleaning system. The cooling of the exhaust stream is obtained after the exhaust gases have been treated. A spark arresting device is fitted at the end of the system. A magnetic explosion proof special economizer device (MECON) is fitted on the engine fuel lines to reduce the $CO_2$ emissions and reduce fuel consumption with atomization of the diesel fuel particles thus minimizing the maintenance of the applied flame arrestors and exhaust after treatments devices.

Applying the inventive processes overcomes many of the problem(s) associated with existing prior art systems.

Table 2 below summarizes the possible treatment of the various components of the system.

TABLE 2

| Component | Coated w/coatex | Jacketed * | Encased | Watercooled * |
|---|---|---|---|---|
| Engine bloc | ✓ * | ✗ | ✗ | ✗ |
| Turbocharger | ✓ | ✓ | ✗ | ✓ |
| Piping coupling engine to turbo charger and exhaust manifold | ✓ | ✓ | ✗ | ✓ |
| Exhaust manifold | ✓ | ✓ | ✗ | ✓ |
| Watercooled flameproof enclosure | ✓ | ✓ | ✗ | ✓ |
| Watercooled exhaust conveyor | ✗ | ✗ | ✗ | ✓ |
| Heat exchanger Watercooled | ✗ | ✗ | ✗ | ✓ |
| Spark arrestor | ✗ | ✗ | ✗ | ✗ |
| Mecon device | ✗ | ✗ | ✗ | ✗ |

* = Optional

1—The engine block 98 can be, but need not be, coated, jacketed encased and water cooled.
2—The turbocharger 301, the piping coupling the turbocharger and the exhaust manifold, and the exhaust manifold 101 are preferably coated, jacketed and water cooled and can be, but need not be, encased.
3—The components in chamber 422 are shown to be encased however these components could just be coated, jacketed and water cooled.
4—The exhaust conveyor 428 and the heat exchanger 430 are preferably water cooled and can be but need not be, coated, jacketed and encased.
5—The spark arrester 426 and the mecon device 601 can be, but need not be, coated, jacketed encased and water cooled.

What is claimed is:

1. An explosion protection system, for an engine having an exhaust output at which high temperature gases are discharged, comprising:
a turbocharger and an exhaust manifold coupled to each other and to the exhaust output of the engine; said turbocharger and said exhaust manifold each having an outer surface;
a first coat of thermal insulation material applied to the outer surfaces of said turbocharger and said exhaust manifold; and
a second coat of surface protecting material applied over the first coat to protect the first coat from being scratched or damaged and to also provide additional insulation; wherein said second coat has an inner surface in contact with the first coat and an external exposed surface; and wherein said first and second coats function to decrease the temperature along said external exposed surface of said second coat below a predetermined level, and wherein said first coat of thermal insulation material includes predetermined amounts of an acrylic resin, a silicone resin, a carbonate powder, a vermiculite, talc and water; and wherein said second coat of surface protecting material includes predetermined amounts of heat-resistant silicone, nitro-thinner, a hardener and a topcoat.

2. The explosion protection system as claimed in claim 1, wherein said exhaust output of said engine, said turbocharger and said exhaust manifold are coupled to each other via piping and wherein said piping is covered by said first coat of thermal insulation material applied to outer surfaces of said piping and by said second coat of surface protecting material applied over the first coat.

3. The explosion protection system as claimed in claim 1, wherein said acrylic resin is $C_3H_4O_2$, said silicone resin is RnSiXmOy, said carbonate powder is $CaCO_3$, said vermiculite is $(Mg+^2, Fe+^2, Fe+^3)_3$, said talc is $Mg_3Si_4OI_{10}(OH)_2$, and wherein said heat-resistant silicone is $Si(OCOCH_3)_4$; said nitro thinner is $CH_3OH$, said hardener is $CH_3N-CO$ and said topcoat material is $CH_3(CH_2)_3OH$.

4. The explosion protection system as claimed in claim 1 wherein a protective jacket is fitted onto each one of said exhaust manifold and turbocharger.

5. The explosion protection system as claimed in claim 4 wherein each protective jacket is made of insulating glass fabric.

6. The explosion protection system as claimed in claim 1, wherein tubing for enabling water-cooling is wound around said turbocharger and said exhaust manifold.

7. The explosion protection system as claimed in claim 1 wherein tubing for enabling water-cooling is wound around said turbocharger and said exhaust manifold; and wherein a protective jacket is fitted onto each one of said exhaust manifold and turbocharger.

8. The explosion protection system as claimed in claim 2, further including tubing coupling said exhaust manifold to an enclosure containing components which include at least one of selective catalytic reduction (SCR) devices or a diesel particulate filter (DPF); and wherein the components of said enclosure are coated with a first coat of thermal insulation material and a second coat of surface protecting material; and wherein the components of said enclosure are water-cooled; and wherein said enclosure is formed of a material which is flame proof.

9. The explosion protection system as claimed in claim 8, further including coupling said enclosure to a water cooled heat exchanger.

10. The explosion protection system as claimed in claim 1, wherein said system further includes at least one component selected from a selective catalytic reduction (SCR) device, a diesel particulate filter (DPF), an exhaust conveyor, a heat exchanger, a spark arrester, and piping coupling said at least one component; and wherein said at least one component have one or more of the following: (a) a thermal coating and a scratch resistant coating; (b) tubing wound around the component for enabling water-cooling; (c) a jacket for covering the component; and (d) an explosion proof enclosure.

11. The explosion protection system as claimed in claim 1, wherein said engine has a fuel input line and a fuel tank and further including a magnetic fuel economizer coupled between the fuel tank and the fuel input line.

12. The explosion protection system as claimed in claim 1, wherein said first coat is composed of materials to function as a sealant of the outer surfaces of said exhaust manifold and turbocharger.

13. The explosion protection system as claimed in claim 12, wherein the second coat is applied to the first coat by providing an adhesive layer between said first and second coats.

14. The explosion protection system as claimed in claim 13, further including an additional protective layer formed over said second coat composed of one of the following: (a) a carbon fiber made of Polyacrylonitrile, (b) rayon, (c) polyoxypropylene diamine, and (d) bisphenol.

15. The explosion protection system as claimed in claim 1, wherein said first layer is attached to the outer surfaces of said exhaust manifold and turbocharger via an adhesive.

16. An explosion protection system for an engine having an exhaust output at which high temperature gases are discharged, comprising:
    a turbocharger and an exhaust manifold coupled to each other and to the exhaust output of the engine via piping; said turbocharger, exhaust manifold and piping having outer surfaces;
    a multi-layered coating arrangement formed over the outer surfaces of selected ones of said turbocharger, exhaust manifold and piping; said multi-layered coating arrangement including a sealing and thermal insulating layer and a protective and thermal insulating layer, and
    wherein said sealing and thermal insulating layer includes predetermined amounts of an acrylic resin, a silicone resin, a carbonate powder, a vermiculite, talc and water; and
    wherein said protective and thermal insulating layer includes predetermined amounts of heat-resistant silicone, nitro-thinner, a hardener and a topcoat.

17. A method for making an explosion protection system for an engine having an exhaust output at which high temperature gases are discharged, where said engine includes a turbocharger and an exhaust manifold coupled to each other and to the exhaust output of the engine via piping; said turbocharger, exhaust manifold and piping having outer surfaces; comprising the steps of:
    applying a first coat of sealing and thermally insulating material to the outer surfaces of at least one of said turbocharger, exhaust manifold and piping; and
    applying a second coat of protective and thermally insulating material to said at least one of one of said turbocharger, exhaust manifold and piping; and
    wherein said first coat of sealing and thermally insulating material includes predetermined amounts of an acrylic resin, a silicone resin, a carbonate powder, a vermiculite, talc and water; and
    wherein said second coat of protective and thermally insulating material includes predetermined amounts of heat-resistant silicone, nitro-thinner, a hardener and a topcoat.

18. An explosion protection system for an engine having an exhaust output at which high temperature gases are discharged, comprising:
    a turbocharger and an exhaust manifold coupled to each other and to the exhaust output of the engine via piping; said turbocharger, exhaust manifold and piping having outer surfaces;
    a multi-layered coating arrangement formed over the outer surfaces of selected ones of said turbocharger, exhaust manifold and piping; said multi-layered coating arrangement including any one of the following:
    (a) a first layer providing sealing and thermal insulation and a second layer providing protection to the first layer and additional thermal insulation; wherein said first coat of sealing and thermally insulating material includes predetermined amounts of an acrylic resin, a silicone resin, a carbonate powder, a vermiculite, talc and water; and wherein said second coat of protective and thermally insulating material includes predetermined amounts of heat-resistant silicone, nitro-thinner, a hardener and a topcoat;
- (b) a first layer providing sealing and thermal insulation, a second high temperature adhesive layer providing adhesion between said first layer and a third overlying protective layer which also provides additional thermal insulation, and a fourth hard coat layer including carbon fiber for providing additional protection and thermal insulation; and
- (c) a first high temperature adhesive layer for attaching a second rock wool layer to which is attached another high temperature adhesive layer for attaching a fourth thermoglass fabric layer and a fifth layer which includes silicic acid, sodium salt, and quartz.

19. A method for making an explosion protection system for an engine having an exhaust output at which high temperature gases are discharged, where said engine includes a turbocharger and an exhaust manifold coupled to each other and to the exhaust output of the engine via piping; said turbocharger, exhaust manifold and piping having outer surfaces; comprising the steps of anyone of the following:
- (a) applying a first layer of sealing and thermally insulating material to the outer surfaces of at least one of said turbocharger, exhaust manifold and piping; and applying a second layer of protective and thermally insulating material overlying said first layer to said at least one of one of said turbocharger, exhaust manifold and piping; and wherein said first layer of sealing and thermally insulating material includes predetermined amounts of an acrylic resin, a silicone resin, a carbonate powder, a vermiculite, talc and water; and wherein said second layer of protective and thermally insulating material includes predetermined amounts of heat-resistant silicone, nitro-thinner, a hardener and a topcoat;
- (b) applying a first layer of sealing and thermal insulating material to the outer surfaces of at least one of said turbocharger, exhaust manifold and piping, and applying a second high temperature adhesive layer providing adhesion between said first layer and applying a third overlying protective layer which also provides additional thermal insulation, and applying a fourth hard coat layer including carbon fiber for providing additional protection and thermal insulation; and
- (c) applying first, second, third, fourth and fifth layers to the outer surfaces of at least one of said turbocharger, exhaust manifold and piping, wherein said first layer is a high temperature adhesive layer for attaching said second layer which is of rock wool, an said third layer is also a high temperature adhesive layer for attaching said fourth layer which is a thermoglass fabric layer to which is attached said fifth layer which includes silicic acid, sodium salt, and quartz.

20. The explosion protection system as claimed in claim 19, further including an additional layer composed of silicic acid, sodium salt, and quartz.

* * * * *